United States Patent
Bashford et al.

(10) Patent No.: US 7,529,877 B2
(45) Date of Patent: May 5, 2009

(54) APPARATUS AND METHODS FOR SIMPLIFIED SSP LINK LAYER PROCESSING

(75) Inventors: Patrick R. Bashford, Fort Collins, CO (US); Timothy E. Hoglund, Colorado Springs, CO (US)

(73) Assignee: LSI Corporation, Milipitas, CA (US)

( * ) Notice: Subject to any disclaimer, the term of this patent is extended or adjusted under 35 U.S.C. 154(b) by 54 days.

(21) Appl. No.: 11/374,260

(22) Filed: Mar. 13, 2006

(65) Prior Publication Data

US 2007/0214303 A1 Sep. 13, 2007

(51) Int. Cl.
*G06F 13/36* (2006.01)
*G06F 13/14* (2006.01)

(52) U.S. Cl. .............. 710/314; 710/100; 710/300; 710/305; 709/220; 709/227; 719/326

(58) Field of Classification Search ........... 719/236; 710/106, 304; 370/469
See application file for complete search history.

(56) References Cited

U.S. PATENT DOCUMENTS

| | | | |
|---|---|---|---|
| 7,093,033 B2 * | 8/2006 | Beckett et al. | 710/11 |
| 7,124,234 B2 * | 10/2006 | Marushak et al. | 710/316 |
| 7,155,546 B2 * | 12/2006 | Seto | 710/100 |
| 7,171,500 B2 * | 1/2007 | Day et al. | 710/106 |
| 2004/0193736 A1 * | 9/2004 | Galloway | 710/1 |
| 2005/0283541 A1 * | 12/2005 | Ain et al. | 710/5 |
| 2006/0095630 A1 * | 5/2006 | Bashford et al. | 710/305 |
| 2006/0101171 A1 * | 5/2006 | Grieff et al. | 710/36 |
| 2006/0106997 A1 * | 5/2006 | Elliott et al. | 711/150 |
| 2007/0011333 A1 * | 1/2007 | Lau et al. | 709/227 |
| 2007/0100847 A1 * | 5/2007 | Slutz et al. | 707/100 |

OTHER PUBLICATIONS

Working Draft American National Standard—Project T10/1562-D—Information technology—Serial Attached SCSI (SAS)—total of 18 pages—Jul. 9, 2003.*
Serial SCSI Bus—retrieved from "http://www.interfacebus.com/Design_Connector_Serial_SCSI_Bus.html" on Jul. 13, 3 pages.*
Serial Attached SCSI—retrieved from "http://en.wikipedia.org/wiki/SCSI" on Jul. 13, 5 pages.*

(Continued)

*Primary Examiner*—Mark Rinehart
*Assistant Examiner*—Brian T Misiura
(74) *Attorney, Agent, or Firm*—Duft Bornsen & Fishman LLP

(57) ABSTRACT

Apparatus and associated methods for a simplified Serial SCSI Protocol ("SSP") link layer within a SAS device. Features and aspects hereof provide a simplified SSP link layer processor to enable cost reduction and simplification of Serial Attached SCSI ("SAS") devices requiring only limited SSP exchange functionality. In one embodiment, a SAS expander may incorporate the simplified SSP link layer features and aspects hereof to permit simple management of SAS devices coupled to the expander or coupled downstream through other expanders. The simplified SSP link layer suffices for simple SAS management functions while reducing cost and complexity of the SAS expander. Features and aspects hereof may be implemented with minimal customized circuits for SSP link layer management in the SAS device. In one aspect hereof, the simplified link layer processing may be implemented as a simplified state machine model in combinatorial logic coupled with any requisite memory components.

16 Claims, 6 Drawing Sheets

OTHER PUBLICATIONS

"Serial Attached SCSI Link layer—part 2"—Sep. 2003—18 pages.*
Maxtor—"Serial Attached SCSI Architecture: Part 2—The SAS Link Layer"—Dec. 2003—6 pages.*

"*Working Draft American National Standard—Project T10/1760-D Inforamtion Technology—Serial Attached SCSI—2 (SAS-2)*"; Revision 02' Jan. 18, 2006; Section 7 (pp. 217-329).

* cited by examiner

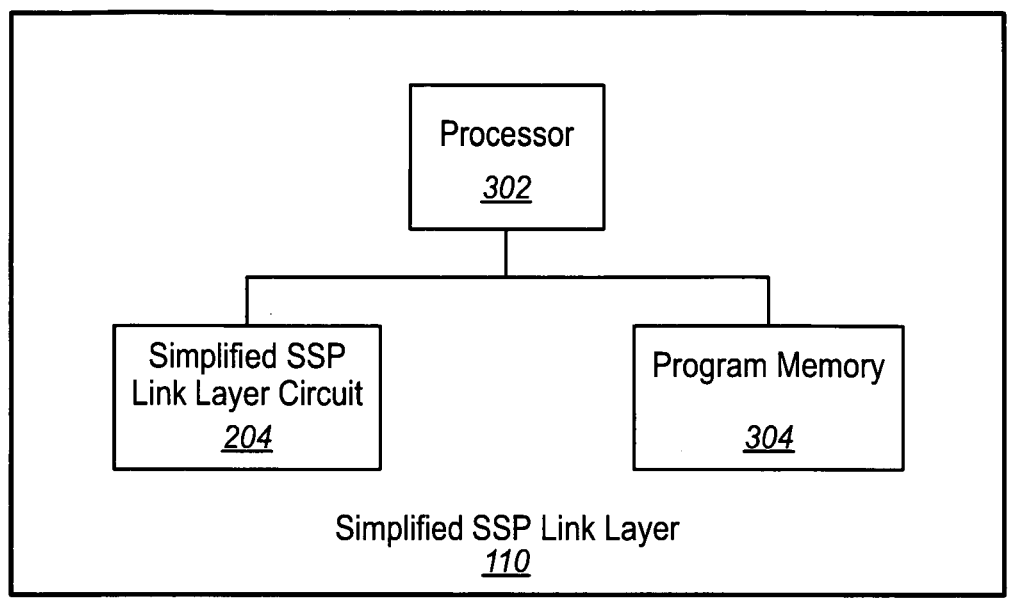
FIG. 3
FIG. 4
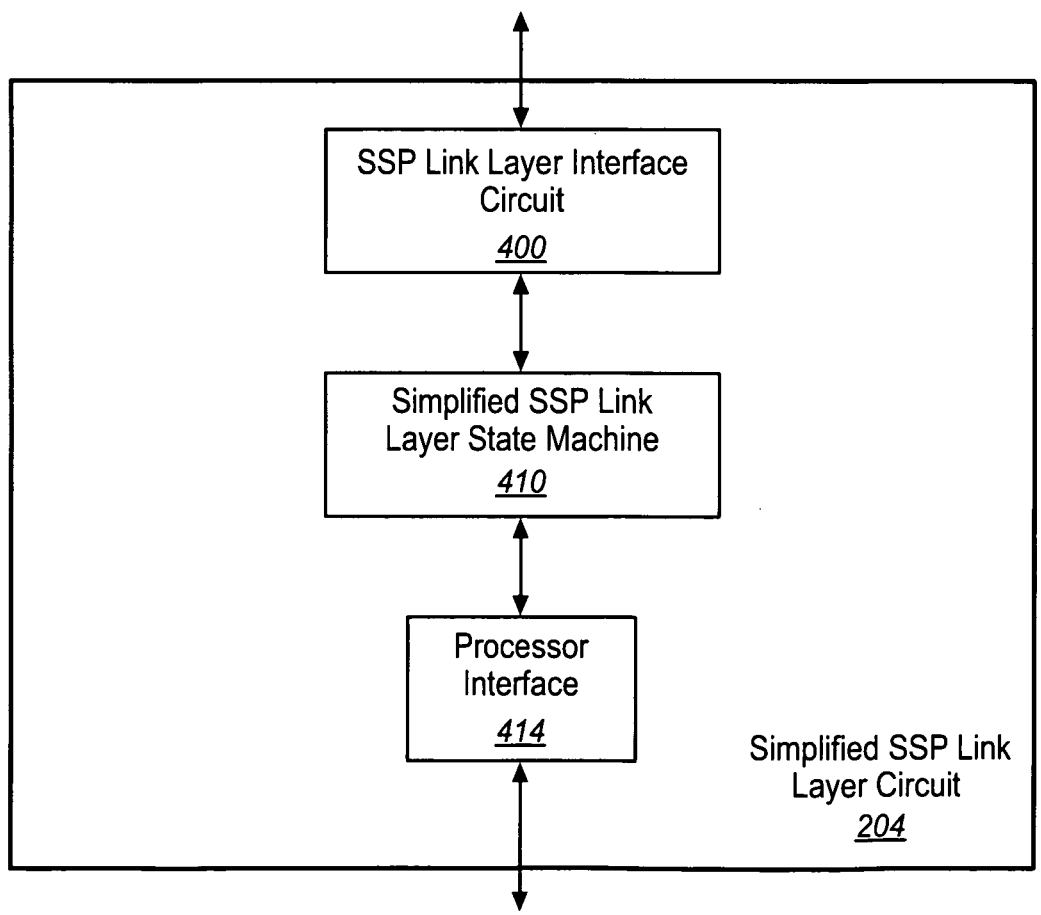

APPARATUS AND METHODS FOR SIMPLIFIED SSP LINK LAYER PROCESSING

BACKGROUND OF THE INVENTION

1. Field of the Invention

The invention relates generally to Serial Attached SCSI ("SAS") domains and more specifically to apparatus and methods for a simplified Serial SCSI Protocol ("SSP") link layer processor providing reduced features coupled with reduced cost and complexity.

2. Discussion of Related Art

Small Computer Systems Interface ("SCSI") is a set of American National Standards Institute ("ANSI") standard electronic interface specifications that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 Fire Wire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS standards as well as other SCSI related specifications and standards. Information about such interfaces and commands is generally obtainable at the website http://www.t10.org. As used herein, "SAS specifications" refers to SAS specifications dating from at least version 1.1 release 05 and later.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

One protocol provided for in the SAS specifications is the Serial SCSI Protocol ("SSP"). SSP is a mapping of SCSI command and status exchanges to the SAS structure where multiple initiators and multiple target devices may exchange information. In general, SSP is used in communicating with SAS SCSI devices coupled to the SAS domain. An SSP initiator (e.g., a host system or a SAS expander) exchanges information with an SSP target (e.g., a SAS SCSI storage device) using the SSP link layer. The SSP link layer generally encapsulates SCSI related exchanges and flow control into SAS domain exchanges.

Operation of a standard SSP initiator and target is generally defined by the SSP link layer specifications of the SAS standard (see generally §7.16 of the SAS specification version 1.1). In a number of particular device applications, the full richness and flexibility of an SSP initiator or SSP target operable in accordance with the SSP link layer specifications is not required. For example, in a SAS expander device that utilizes SSP exchanges only for limited management of attached SCSI devices attached to the expander or attached downstream from the expander, a fully featured SSP initiator or SSP target capability is not required. Rather, only a relatively small subset of the full SSP feature set is used for such a limited management purpose.

However, current SSP initiator circuits provide only a fully featured SSP capability intended primarily for other applications requiring full featured SAS initiator or target support for all SAS related protocols. Such a fully featured SAS device including SSP initiator and target link layer features is costly and complex in such application though only a small fraction of the features are actually required.

It is evident from the above discussion that a need exists for a simplified SSP link layer useful in applications that do not require a fully featured SSP link layer services.

SUMMARY OF THE INVENTION

The present invention solves the above and other problems, thereby advancing the state of the useful arts, by providing apparatus and methods for a simplified SSP link layer processor useful in a variety of SAS devices that do not require a fully featured SSP link layer function. For example, in one embodiment, an enhanced SAS expander may incorporate a simplified SSP link layer component in accordance with features and aspects hereof to reduce cost and complexity of the SAS expander while still providing adequate SSP initiator and target support for required SCSI device management or other management functions.

A feature hereof therefore provides a Serial Attached SCSI ("SAS") device comprising: a Serial SCSI Protocol ("SSP") management element for performing management functions for SAS SCSI devices coupled to the expander; and a simplified Serial SCSI Protocol ("SSP") link layer circuit coupled to the management element and adapted to manage SSP link layer exchanges in conjunction with the management element, wherein the simplified SSP link layer circuit is adapted to exchange only a single frame during any open connection with a second SAS device.

Another aspect hereof further provides that the link layer circuit further comprises: an SSP link layer state machine circuit for controlling SSP link layer exchanges in accordance with a state machine model such that only a single frame is exchanged during any open connection to the second SAS device.

Another aspect hereof further provides an SSP application layer circuit coupled to the SSP link layer state machine circuit, wherein the SSP application layer circuit is adapted to open a connection to a SAS device, wherein the SSP application layer circuit is further adapted to enable operation of the SSP link layer state machine in response to opening the connection, and wherein the SSP link layer state machine circuit is operable in an IDLE state when not enabled by the SSP application layer circuit.

Another aspect hereof further provides that the SSP application layer is further adapted to close the connection following exchange of a single frame with the second SAS device, and provides that the SSP application layer is further adapted to disable operation of the SSP link layer state machine circuit in response to closing the connection, and provides that the SSP link layer state machine circuit continues operation in the IDLE state in response to being disabled by the SSP application layer circuit.

Another aspect hereof further provides that the SSP link layer state machine circuit is adapted to assure exchange of only a single frame during an open connection by controllably sending RRDY and CREDIT_BLOCKED primitives to the second SAS device.

Another aspect hereof further provides that the SSP link layer state machine circuit is adapted to send a single RRDY primitive followed by a CREDIT_BLOCKED primitive to the second device to allow reception of a single frame from the second device when the open connection is intended to receive a single frame, and provides that the SSP link layer state machine circuit is adapted to send a CREDIT_BLOCKED primitive and no RRDY primitive to the second device to permit transmission of a single frame to the second device when the open connection is intended to transmit a single frame.

Another feature hereof provides a method operable in a first SAS device to exchange an SSP frame with a second SAS device to manage aspects of the second SAS device, the method comprising: opening a connection to the second SAS device; enabling operation of a simplified SSP link layer state machine circuit within the first SAS device to controllably transmit or receive only a single SSP frame with the second SAS device; closing the open connection; and disabling continuing operation of the simplified SSP link layer state machine circuit in response to closing the open connection.

Another aspect hereof further provides that the step of enabling further comprises enabling the link layer state machine to transmit only a single SSP frame from the first SAS device to the second SAS device.

Another aspect hereof further provides that the step of enabling the link layer state machine circuit to transmit further comprises: sending a CREDIT_BLOCKED primitive from the first SAS device to the second SAS device without sending any RRDY primitives to indicate that the first SAS device cannot receive any SSP frame; and transmitting a supplied SSP frame from the first SAS device to the second SAS device.

Another aspect hereof further provides that the step of enabling further comprises enabling the link layer state machine to receive only a single SSP frame within the first SAS device from the second SAS device.

Another aspect hereof further provides that the step of enabling the link layer state machine circuit to receive further comprises: sending a single RRDY primitive from the first SAS device to the second SAS device to indicate a buffer credit to receive a single SSP frame; sending a CREDIT_BLOCKED primitive from the first SAS device to the second SAS device to indicate that no additional buffer credit is available in the first SAS device; and receiving an SSP frame within the first SAS device from the second SAS device.

Another feature hereof provides a method operable in a first SAS device to exchange an SSP frame with a second SAS device to manage aspects of the second SAS device, the method consisting: opening a connection to the second SAS device; exchanging no more than a single SSP frame with the second SAS device; and closing the open connection.

Another aspect hereof further provides that the step of exchanging further comprises enabling a simplified SSP link layer state machine to transmit only a single SSP frame from the first SAS device to the second SAS device.

Another aspect hereof further provides that the step of enabling the simplified SSP link layer state machine circuit to transmit further comprises: sending a CREDIT_BLOCKED primitive from the first SAS device to the second SAS device without sending any RRDY primitives to indicate that the first SAS device cannot receive any SSP frame; and transmitting a supplied SSP frame from the first SAS device to the second SAS device.

Another aspect hereof further provides that the step of exchanging further comprises enabling a simplified SSP link layer state machine to receive only a single SSP frame within the first SAS device from the second SAS device.

Another aspect hereof further provides that the step of enabling the simplified SSP link layer state machine circuit to receive further comprises: sending a single RRDY primitive from the first SAS device to the second SAS device to indicate a buffer credit to receive a single SSP frame; sending a CREDIT_BLOCKED primitive from the first SAS device to the second SAS device to indicate that no additional buffer credit is available in the first SAS device; and receiving an SSP frame within the first SAS device from the second SAS device.

BRIEF DESCRIPTION OF THE DRAWINGS

FIG. 3 is a block diagram providing details of an exemplary simplified SSP link layer processor in accordance with features and aspects hereof.

FIG. 4 is a block diagram providing additional details of an exemplary simplified SSP link layer circuit as shown in FIG. 3.

DETAILED DESCRIPTION OF THE DRAWINGS

Figure 1:
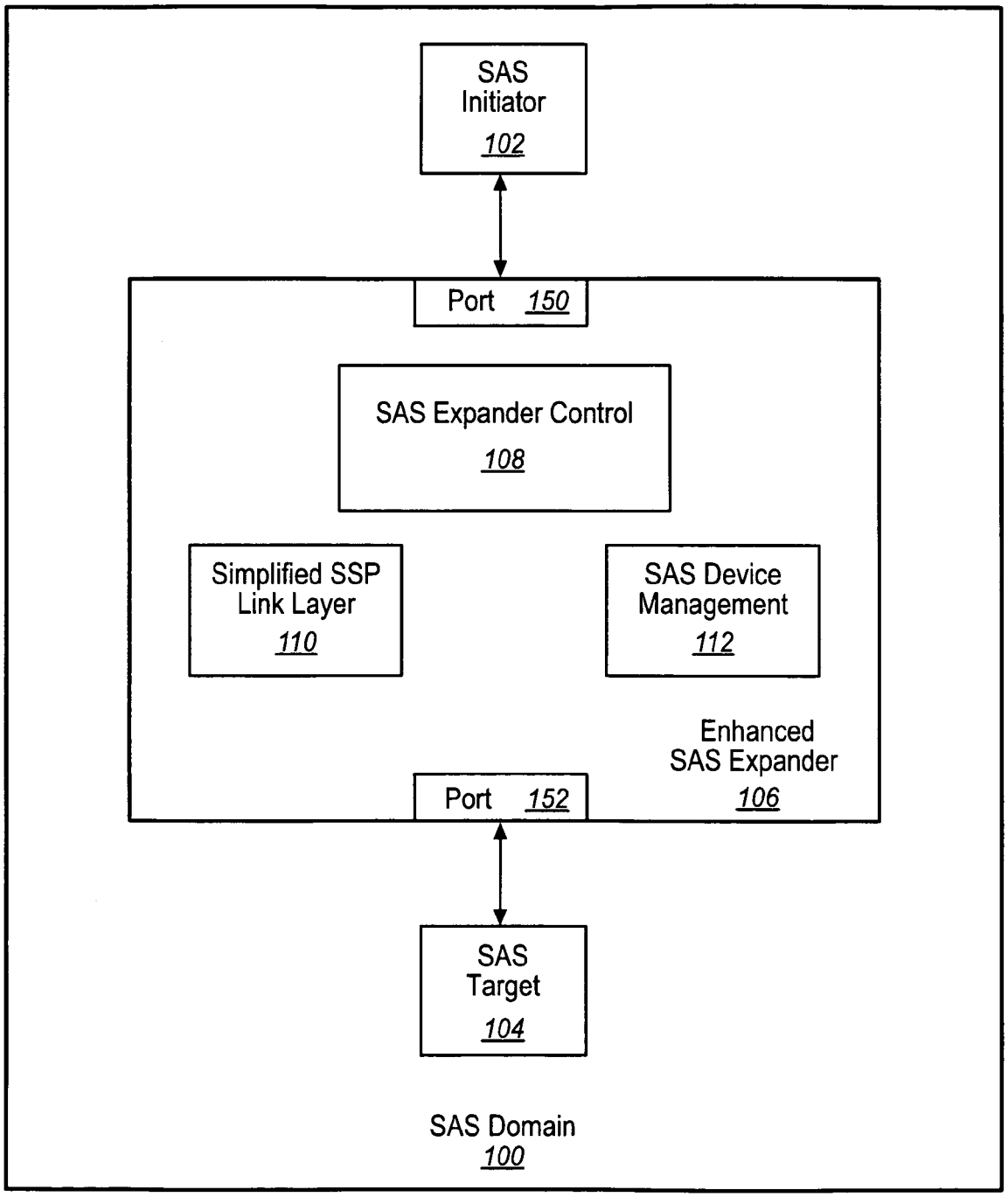
FIG. 1 is a block diagram of a system (A SAS domain) including an exemplary SAS expander enhanced in accordance with features and aspects hereof to provide a simplified SSP link layer processor within the enhanced SAS expander.

FIG. 1 is a block diagram of a SAS domain 100 in which features and aspects hereof are advantageously applied. SAS domain 100 generally includes one or more SAS initiators 102 such as host systems or other storage controller components. Each SAS initiator 102 may communicate through enhanced SAS expander 106 with one or more SAS targets 104. SAS targets 104 may be, for example, disk drives or other storage devices to be accessed by the corresponding SAS initiators 102. In general, SAS initiator 102 initiates exchanges with an identified SAS target 104 and forwards information therebetween through corresponding ports of enhanced SAS expander 106. Those of ordinary skill in the art will readily recognize that SAS domain 100 may include any number of SAS initiators 102 and SAS target devices 104 as well as other SAS devices (e.g., SAS targets and SAS initiators) and any number of SAS expanders 106 to provide flexible scalability of the storage subsystem represented by SAS domain 100. SAS initiator 102 and SAS target 104 may be coupled through any number of SAS expanders 106 frequently arranged in a hierarchical fashion as well as other well-known networking topologies.

Enhanced SAS expander 106 is coupled to SAS initiator 102 through a corresponding port 150 and is coupled to SAS target 104 through a corresponding port 152. Any number of such ports may be provided in enhanced SAS expander 106. Each port (150 and 152) of enhanced SAS expander 106 is a logical port and may be comprised of one or more physical links commonly referred to as "PHYs". Each port in the enhanced SAS expander 106 is therefore a logical construct that may be configured to include one or more such physical links.

SAS expander 106 may include SAS expander control element 108 for performing normal operation of the enhanced SAS expander 106. Such normal operation may include any and all features associated with the SAS specifications to permit exchange of information between SAS devices and between SATA devices coupled to ports of the enhanced SAS expander 106. A typical SAS expander 106 may also include SAS device management element 112 adapted to perform certain administrative functions associated with SAS devices coupled to ports of the enhanced SAS expander 106. When performing such SAS device management functions, SAS expander 106 may include logic to provide SAS link layer features for performing limited exchanges with SAS devices for purposes of administrative management thereof. Typically, SAS device management element 112 utilizes SSP exchanges to provide the desired administrative functions. A typical SAS expander as presently known in the art may therefore include a fully featured SSP link layer component (not shown in the enhanced expander of FIG. 1) to permit initiation of SSP exchanges with SAS devices coupled to the SAS expander for purposes of SAS device management.

Such a fully featured SSP link layer provides a rich set of functions for purposes of implementing the entirety of SSP protocol exchanges. Many of the functional elements within a typical SAS expander are performed within custom circuitry designed and adapted specifically to provide the SAS expander control element 108 features, the SAS device management features 112, and other associated SSP link layer features. Such custom circuits can therefore be highly complex and hence costly components. To reduce complexity and associated cost of such custom circuits and in accordance with features and aspects hereof, some functionality associated with SAS expander control element 108 and SAS device management element 112 may be implemented as suitably programmed instructions operable within a general or special purpose processor within the SAS expander. Though some features may be implemented as suitably programmed instructions, thereby reducing cost and complexity of the custom circuits typically embedded within a SAS expander, numerous aspects of a fully featured SSP link layer as provided in current SAS expander must be implemented within custom circuits for speed requirements of the SAS standards.

As noted above, the SSP link layer features utilized by SAS device management element 112 of enhanced SAS expander 106 are limited by comparison with a fully featured SSP link layer. The SSP exchanges performed for such administrative functions tend to be simple, short exchanges as compared to the full features provided by a fully functional SSP link layer. Thus, in accordance with features and aspects hereof, enhanced SAS expander 106 provides simplified SSP link layer 110 to perform simplified SSP exchanges required by SAS device management element 112 but is substantially devoid of other SSP link layer features provided for in the SAS specifications.

For example, simple exchanges of a single frame do not require interlocked frames as specified in sections 7.16.7.3 AND 7.16.7.9 of the SAS specifications. Or, for example, the simplified SSP link layer may be devoid of the complexity of multiple buffer credits as specified in the SAS specifications at sections 7.16.7.8 and 7.16.7.4. Or further, for example, the simplified SSP link layer may be devoid of the complexity of complex sequencing of RRDY, CREDIT_BLOCKED, and DONE primitives in the full featured transmit state machine as specified in the SAS specifications at sections 7.16.7.10. Or further, for example, the simplified SSP link layer may be devoid of processing required for support of full-duplex transfers since each transaction in the simplified link layer processing identifies exchange of a single frame in one direction.

Further, simplified SSP link layer 110 may also be at the implemented in part through custom circuitry and in part through suitably programmed instructions executed by a general or special purpose processor within the enhanced SAS expander 106. Simplified SSP link layer 110 therefore dramatically simplifies the custom circuitry required within enhanced SAS expander 106 utilized for limited SSP link layer purposes.

Those of ordinary skill in the art will readily recognize a variety of additional features and functions useful or required within a fully operational SAS expander 106. Such additional functions and features are omitted herein simply for brevity of this description. Still further, the functional elements shown in FIG. 1 are intended merely as one possible functional decomposition of elements within enhanced SAS expander 106. Those of ordinary skill in the art will recognize other functional decompositions of the functions therein providing either higher integration or more separation of the various functional elements. Still further as noted above, the various functional elements depicted within enhanced SAS expander 106 may be implemented either totally as suitably programmed instructions in a general or special purpose executed by a general or special purpose processor within the enhanced SAS expander 106, may be implemented solely as custom designed circuitry for performing such functions, or may be implemented as a combination of custom designed circuits and suitably programmed instructions executed by a general or special purpose processor within enhanced SAS expander 106. In particular, simplified SSP link layer element 110 may preferably be implemented as a combination of simpler custom design circuits operable in combination with suitably programmed instructions executed by a general or special purpose processor within the enhanced SAS expander 106.

Figure 2:
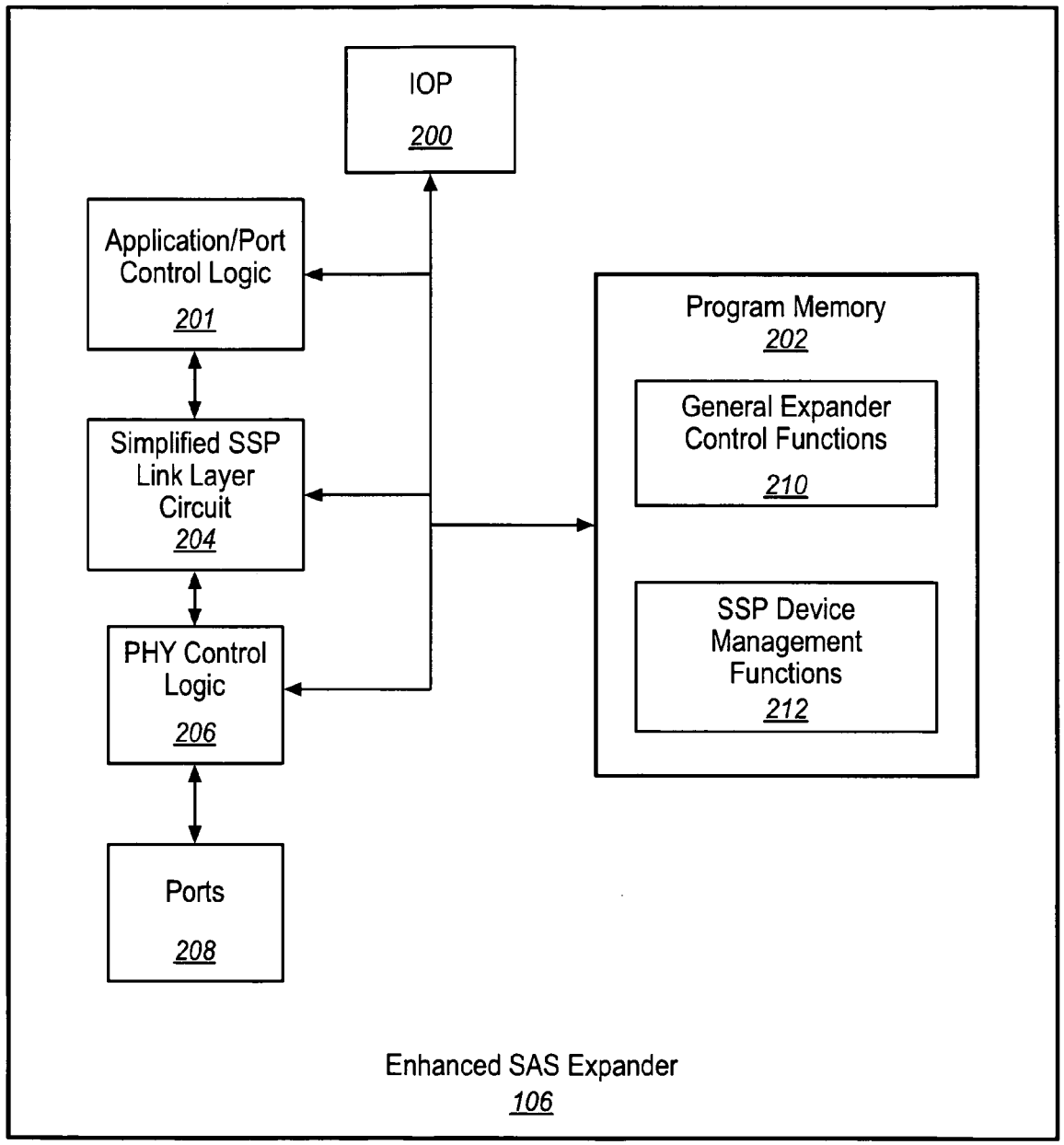
FIG. 2 is a block diagram providing additional details of an exemplary SAS expander enhanced in accordance with features and aspects hereof to provide a simplified SSP link layer within the enhanced SAS expander.

FIG. 2 is a block diagram providing additional details of an exemplary enhanced SAS expander 106 indicating specific circuit components that may be present within such a device. I/O processor 200 ("IOP") is a general or special purpose processor operable in accordance with programmed instructions stored in program memory 202. The instructions and associated data stored in program memory 202 may include general expander control functions 210 that when executed perform general services and protocol exchanges in accordance with SAS specifications for a SAS expander. Further, program memory 202 may include program instructions and associated data for SSP management functions 212. As noted above, a variety of SAS device management functions may be performed using a combination of SAS application management firmware or software operable in a SAS expander in conjunction with the simplified SSP link layer circuit 204. Other aspects of SAS communication may also be implemented in logic circuits such as application/port control logic 201 and PHY control logic 206. Simplified SSP link layer circuit 204 may interact with logic 201 and logic 206 to perform its intended function of controlling SSP link layer exchanges.

Simplified SSP link layer circuit 204 provides a customized circuit adapted to perform simple SSP link layer exchanges in conjunction with programmed instructions and data (e.g., SSP management functions 212) executed by IOP 200. Simplified SSP link layer circuit 204 performs SSP link layer exchanges with cooperation of PHY control logic 206 and ports 208 to exchange simple SSP protocol information between the enhanced SAS expander 106 and an attached SAS device. As noted above, such simple SSP exchanges are useful for administrative functions performed within an enhanced SAS expander 106 to manage certain aspects of SAS devices coupled thereto. Those of ordinary skill in the art will recognize a variety of additional circuits and components useful in a fully functional SAS expander. Such additional elements are excluded from FIG. 2 only for purposes of brevity in this discussion and are otherwise well known to those of ordinary skill in the art.

As shown in FIG. 2, a simplified SSP link layer is represented as a combination of simplified SSP link layer functions 212 programmed instructions stored in program memory 202 and executed by IOP 200 in conjunction with the simplified SSP link layer custom circuit 204. Frequently, a SAS expander includes IOP 200 for other purposes such as those expressed by general expander control functions 210 of FIG. 2. Where such an IOP 200 is already present within the SAS expander, that processing power may be utilized for the simplified SSP link layer functions in conjunction with a simplified SSP link layer custom circuit. In other instances, the simplified SSP link layer 110, such as in FIG. 1, may include its own local processor so as to obviate reliance on an existing I/O processor in a SAS expander or other device in which the simplified SSP link layer 110 is integrated. FIG. 3 is a block diagram showing such a simplified SSP link layer 110 having its own processor 302 and associated program memory 304 coupled with a custom simplified SSP link layer processing circuit 204. Suitably programmed instructions and associated data stored in program memory 304 and accessed by processor 302 in conjunction with simplified SSP link layer circuit 204 may perform the features of the simplified SSP link layer 110 without reliance on processing power from an IOP or other processor within the device embodying the simplified SSP link layer.

FIG. 4 is a block diagram providing additional details of an exemplary simplified SSP link layer circuit 204 as shown in FIGS. 2 or 3 above. Simplified SSP link layer custom circuit 204 may include an SSP link layer interface circuit 400 coupling circuit 204 to other associated control logic of the SAS expander. For example, circuit 400 may couple circuit 204 to associated circuits for higher level SAS control such as application/port layer control logic and to lower level control such as PHY control logic. Processor interface 414 couples circuit 204 to the associated processor providing the higher level control for the simplified SSP link layer functions to be performed by circuit 204. Those of ordinary skill in the art are well aware of the various higher and lower level state machine models suggested in the SAS specifications. Sections 5 through 10 of the SAS specifications are well known to those of ordinary skill in the art and spell out requirements for fully functional layers involved in such communications—including state machine models for each layer. To simplify discussion herein, Applicants refer generally to higher level state machines as application and/or port layer state machine and generally refer to lower level state machines as link layer state machines. For example, SAS standards also include Application, Transport, Port, Link, PHY, SL, and XL layers that may cross or blur any rigid boundaries defined as "higher" or "lower". But for the sake of simplicity in this discussion such fine distinctions are eliminated. Those of ordinary skill in the art would readily recognize where features and aspects hereof may best fit in the specified layers of SAS and which other SAS standard state machine models would provide any suggested interactions with features and aspects hereof. Thus, references herein to higher and/or lower level state machines or to application, port, and link layers should be understood not as limiting of the scope of the invention but merely as suggestive of other SAS standard state machines and associated SAS communication layers with which features and aspects hereof may interact.

Simplified SSP link layer state machine 410 represents logic circuits operable to perform simplified SSP exchanges in accordance with a state machine model for such SSP exchanges. As generally known in the art and as specified in the SAS standards at section 7.16, the SSP is specified to operate in accordance with a state machine model that defines the protocols exchanges. In accordance with features and aspects hereof, simplified SSP link layer state machine 410 dramatically reduces the complexity of the specified, fully featured state machine to provide a limited set of functions required for simple SAS device management within the enhanced SAS expander (or other device using the simplified SSP link layer features and aspects hereof). This simplified state machine dramatically reduces the complexity (and hence costs) of the SAS expander (or other device) that requires the SSP link layer processing only for simple management exchanges to manage SAS devices attached thereto.

Simplified SSP link layer state machine 410 is an exemplary embodiment of features and aspects hereof to provide a simplified link layer processing for use within an enhanced SAS expander or other device integrating features and aspects hereof. Although a state machine implementation is one common approach for providing communication protocol features, it is intended here as merely one exemplary embodiment of features and aspects hereof. Those of ordinary skill in the art will readily recognize a wide variety of equivalent design paradigms useful for providing the simplified SSP link layer features and aspects hereof. Therefore, more generally, the simplified link layer processing features and aspects hereof provide a number of simplifications of SSP exchanges as compared to a fully featured SSP link layer processing component. In accordance with features and aspects hereof, simplified link layer processing provides some or all of the following simplifications:

1. Sending a single SAS RRDY primitive to grant only a single receive buffer credit to the connected SAS device when the intent of the open connection is to receive an SSP frame from the identified device.
2. Not granting any credit to the connected SAS device when the intent of the open connection is to transmit a single, supplied SSP frame to an identified SAS device.
3. Always closing the open connection after a single frame is sent or received.
4. Sending a SAS CREDIT_BLOCKED primitive to a connected SAS device after transmission of the single RRDY primitive when the intent of the open connection is to receive a single SSP frame from the connected SAS device.
5. Sending a CREDIT_BLOCKED primitive immediately after a connection is opened with a SAS device when the intent of the connection is to send a single SSP frame to the connected SAS device.
6. Sending a DONE primitive immediately after sending the CREDIT_BLOCKED primitive when the intent of the open connection is to receive a single SSP frame from the connected SAS device.
7. Sending a DONE primitive immediately after transmitting the frame and receiving an ACK or NAK primitive or detecting an ACK/NAK timeout when the intent of the connection is to send a single SSP frame to an identified SAS device.

Viewed from another perspective, the simplified link layer processing in accordance with features and aspects hereof is devoid of complexity associated with processing of various aspects of a fully features SSP link layer processor as presently practiced. For example, a simplified SSP link layer processor in accordance with features and aspects hereof may be devoid of processing associated with one or more of the following features of a standard SSP processor:

1. Support for multiple buffer credits. A standard SSP link layer state machine includes logic to process up to 255 buffer credits by issuing RRDY primitives to an attached SAS device. By contrast, the simplified SSP link layer state machine in accordance with features and aspects hereof need only process availability of a single buffer credit and thus may eliminate complex state machine associated receive frame credit monitoring and transmit frame credit monitoring.
2. Support of both interlocked and non-interlocked frame exchanges. A fully featured SSP link layer state machine needs to process both interlocked and non-interlocked frame exchanges. However, since a simplified SSP link layer state machine in accordance with features and aspects hereof need only process a single frame exchange, there is no need for a transmit or receive interlocked frame monitor state machine.
3. Complex logic associated with transmission of RRDY, CREDIT_BLOCKED, and DONE primitives in conjunction with transmission of multiple frames. Since the simplified SSP link layer state machine in accordance with features and aspects hereof need only transmit a single frame this transmission logic may be dramatically simplified.
4. Full duplex transmission. Since the simplified SSP link layer state machine in accordance with features and aspects hereof sends or receive only a single frame during an open connection, there is no need to support simultaneous transmission and reception of frames in a full duplex mode. Each connection is established for the limited purpose of sending one frame or receiving one frame—not both transmission and reception.

Those of ordinary skill in the art will readily recognize numerous additional simplifications that may be provided in accordance with features and aspects hereof to implement a simplified SSP link layer processing element. Further, those of ordinary skill in the art will readily recognize that subsets of the above simplifications may be provided in a particular implementation of features and aspects hereof to provide some but not all of the above simplifications. Thus, the above list of simplifications is intended merely as exemplary of possible simplifications in a simplified SSP link layer processing element in accordance with features and aspects hereof. The list is not intended as an exhaustive list of all possible simplifications nor is the list intended as a minimum list of required simplifications. For example, those of ordinary skill in the art may choose to implement. only simplifications associated with the reception of SSP frames from another SAS device or may choose to implement only simplifications associated with transmission of an SSP frame to a connected SAS device. Such matters of design choice are well known to those of ordinary skill in the art.

Figure 5:
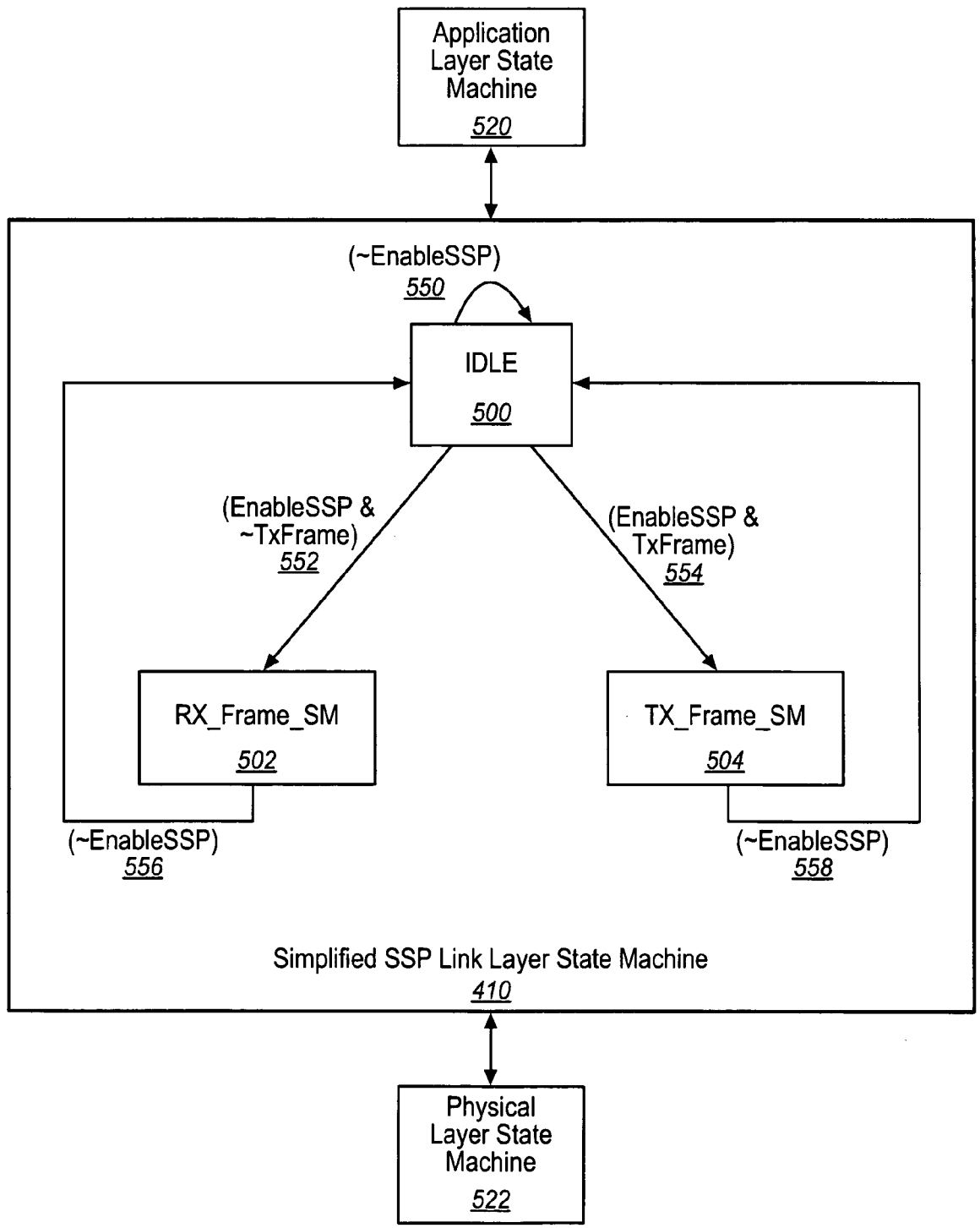
FIG. 5 is an exemplary state machine diagram depicting operation of a simplified SSP state machine circuit in accordance with features and aspects hereof.
Figure 6:
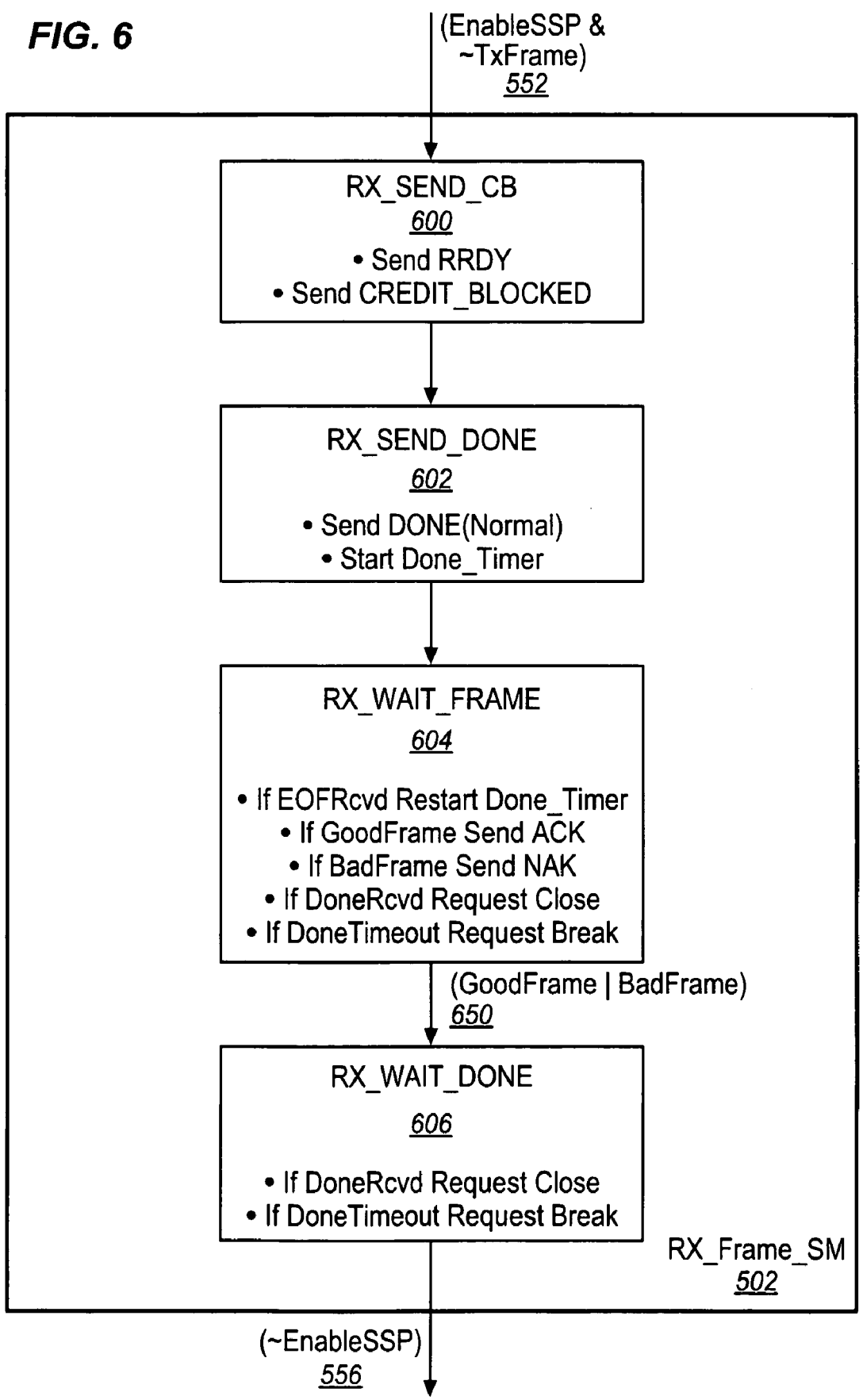
FIG. 6 is a block diagram providing additional exemplary details of a receive frame portion of the state machine diagram of FIG. 5.
Figure 7:
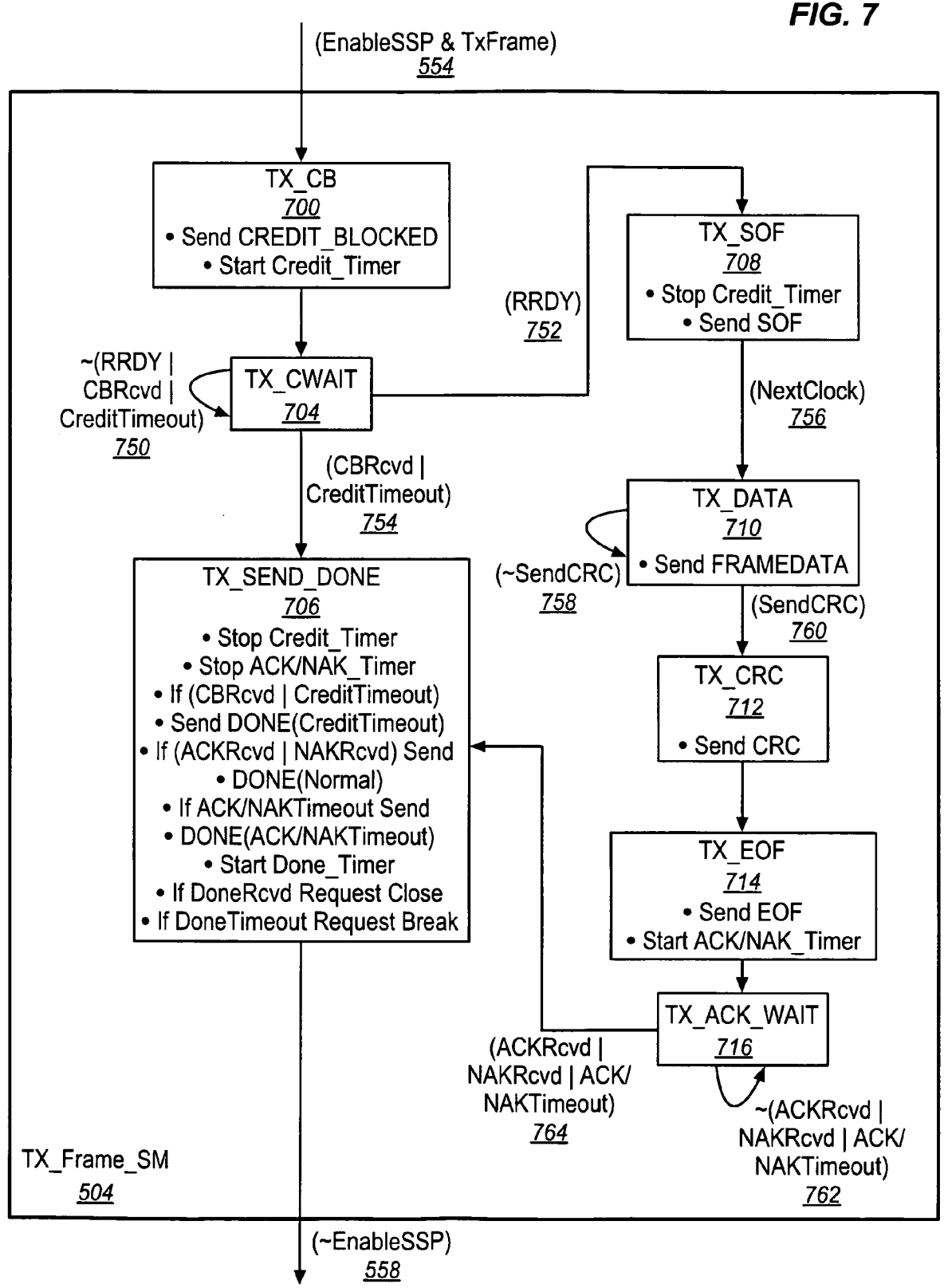
FIG. 7 is a block diagram providing additional exemplary details of a transmit frame portion of the state machine diagram of FIG. 5.

In addition to the above list of simplification features, FIGS. 5 through 7 describe an exemplary embodiment of a simplified SSP link layer processing element implemented as a state machine. Those of ordinary skill in the art will readily recognize designs utilizing combinatorial logic and memory components to construct a state machine circuit to implement the state machine models expressed by FIGS. 5 through 7.

In the state machine diagrams of FIGS. 5 through 7, a state is indicated as a box with a name for the state and is coupled to other states by arrows representing transitions between states. The arrows between states are annotated with Boolean predicate conditions that cause the associated transition. In addition, each state may include particular actions indicated with in the box for the state that may occur upon entrance to and/or exit from the state or at any time during operation of the state machine in that particular state. Those of ordinary skill in the art are well aware of design methodologies to translate such a state machine diagram into corresponding circuits or into hardware description language code useful for logic circuit synthesis and simulation. Such translation processes are well known to those of ordinary skill in the art and may utilize any of a number of well known, commercially available, hardware description languages including, for example, Verilog HDL and other well known hardware description languages. In particular, those of ordinary skill in the art will recognize that the specified actions associated with entrance or exit from a state may be associated with exit from a previous state or with the entrance to a subsequent state. Thus, the particular point at which particular actions are taken is intended to be merely suggested by the association of a state and actions in the state machine models of FIGS. 5 through 7. Even more specifically, those of ordinary skill in the art will readily recognize that some actions listed within a state of FIGS. 5 through 7 may preferably be performed on sequential clock cycles rather than all on a common clock cycle. Again, such design and implementation details and choices are well understood by those of ordinary skill in the art. Thus, the state machine models of FIGS. 5 through 7 are not intended to suggest precise design rules or signal timings but rather the general sequencing of states and actions associated with those states and/or with transitions between states.

FIG. 5 shows an exemplary state machine diagram of an embodiment of simplified SSP link layer state machine 410. Link layer state machine 410 may interact with other elements also implemented as state machines or as other forms of custom circuits and/or suitably programmed instructions in a general or special purpose processor. For example, link layer state machine 410 may interact with a higher application layer state machine 520 that handles particular SAS device management applications useful for managing SAS devices coupled to an enhanced SAS expander or other device incorporating features and aspects hereof. In addition, link layer state machine 410 may interact with a lower level physical layer state machine 522 operable to control lower level physical or PHY layer interaction to receive signals from the SAS communication medium and to apply signals thereto for purposes of exchanging SAS frames.

In general, a higher level application layer state machine 520 may initiate operation of link layer state machine 410 by asserting an EnableSSP signal applied to the link layer state machine 410. Application layer state machine 520 may also controllably apply a signal (TxFrame) indicating whether enablement of the link layer state machine 410 is intended for reception of an expected SSP frame or transmission of a supplied SSP frame. The EnableSSP signal may be asserted active high and the TxFrame signal may be asserted active high to indicate a request to transmit a supplied SSP frame. Or, the EnableSSP signal may be asserted active high and the TxFrame signal may be de-asserted inactive low to indicate a request to receive an expected SSP frame from an attached SAS device.

Link layer state machine 410 is operable looping in IDLE state 500 while the enable SSP signal is presently de-asserted. Transition arrow 550 indicates looping in IDLE state of 500 so long as EnableSSP is de-asserted (e.g., asserted inactive low). When application layer state machine 520 is ready to send or receive an SSP frame, it will appropriately assert or de-assert the TxFrame signal and assert active high the EnableSSP signal. One of two transitions from the idle state 500 will then occur within link layer state machine 410. If TxFrame is de-asserted, transition 552 changes the link layer state machine 410 to the RX_Frame_SM 502 state machine. RX_Frame_SM 502 represents a portion of the link layer state machine 410 operable to receive an SSP frame from an attached SAS device. If the TxFrame signal is asserted high by the application layer state machine 520 when the EnableSSP signal is also asserted, transition 554 transitions link layer state machine 410 into the TX_Frame_SM 504 state machine. TX_Frame_SM 504 represents a portion of the link layer state machine 410 operable to transmit a supplied SSP frame to an identified SAS device coupled to the enhanced SAS expander or other device incorporating the link layer state machine 410. RX_Frame_SM 502 and TX_Frame_SM 504 are both discussed in further detail below and perform requisite processing to receive an SSP frame or transmit an SSP frame, respectively. Both portions (502 and 504) of link layer state machine 410 interact with the application layer state machine 520 and physical layer state machine 522 to effectuate the requested SSP frame reception or transmission. When the requested exchange is completed, application layer state machine 520 will deassert the EnableSSP signal thus causing transition 556 from state 502 back to IDLE state 500 or transition 558 from state 504 back to IDLE state 500.

Those of ordinary skill in the art will readily recognize that link layer state machine 410 may be more or less tightly integrated with physical layer state machine 522 and/or application layer state machine 520. Features and aspects hereof relate most specifically to simplification of the link layer state machine processing and thus FIG. 5 isolates those features from application layer state machine 520 and physical layer state machine 522 simply to simplify the discussion herein.

FIG. 6 provides additional details of an exemplary implementation operation of the RX_Frame_SM 502 portion of link layer state machine 410 of FIG. 4 to receive a single SSP frame from an attached SAS device. The higher level (application layer) state machine may establish the open connection to connect to the desired SAS device and then enable the SSP link layer state machine to receive an expected SSP frame. When enabled by the higher level application layer state machine (by assertion of EnableSSP and de-assertion of TxFrame as suggested above), RX_SEND_CB state 600 is entered. Upon entry to state 600, an RRDY primitive is sent to the attached SAS device (through interaction with the lower level physical layer state machine). The RRDY primitive transmission includes implied buffer credit for transmission of a single SSP frame from an attached SAS device. In addition, a CREDIT_BLOCKED primitive is sent to an attached device to indicate no additional buffer credits are forthcoming from this device.

State 600 then transitions to the RX_SEND_DONE state 602. A DONE primitive indicating a normal completion is then sent to the attached device upon entry to state 602 to indicate that no transmission is forthcoming from this device—i.e., the device is prepared to receive a single SSP frame and will not transmit an SSP frame. A Done_Timer is then started to await reception of the expected frame or a DONE primitive from the attached device.

State 602 then transitions to RX_WAIT_FRAME state 604 to await reception of the expected SSP frame or a timeout condition while waiting. The lower level (physical layer) state machine interacts with the link layer state machine to indicate what was received (if anything). If nothing was received the Done_Timer will eventually expire and a DoneTimeout signal may be asserted (e.g., by the higher or lower level state machine control) to so indicate. In case of such a timeout, state 604 may request from the higher level application layer state machine that a break signal be sent to the attached device.

As the lower level physical layer state machine receives portions of an SSP frame transmission, signals may be applied to the link layer state machine. If an EOF primitive is received indicating completion of reception of an SSP frame, an EOFRcvd signal may be applied to the link layer state machine from the lower level state machine. Responsive to the EOFRcvd signal, state 604 may restart the Done_Timer awaiting the reception of a completed frame. If a good frame is received at the lower level physical layer state machine, a GoodFrame signal is applied to the link layer state machine to so indicate. State 604 responds to the GoodFrame signal by instructing the physical layer state machine to send an ACK primitive in response to receipt of the single good SSP frame. Conversely if an erroneous frame is received, the lower level physical layer state machine applies a BadFrame signal to the link layer state machine to so indicate. Responsive to this BadFrame signal, state 604 directs the lower level physical layer state machine to send a NAK primitive in response to the erroneous SSP frame. Eventually a DONE primitive will be received from the lower level physical layer and a DoneRcvd signal applied to the link layer state machine to so indicate. In response to a DoneRcvd signal, state 604 applies a signal requesting that the upper level application layer state machine close the presently open connection.

If either a GoodFrame or BadFrame signal is detected, state 604 transitions to RX_WAIT_DONE state 606 as indicated by arrow 650 to await receipt of a DONE primitive from the attached device that sent a received frame (if not already received). As above for state 604, state 606 awaits either a DoneRcvd signal from the lower level physical layer state machine or a DoneTimeout signal indicating a timeout in the wait therefore. Detection of a DoneRcvd signal causes state 606 to request closure of the open connection by the upper level application layer state machine. Detection of a DoneTimeout signal causes state 606 to request transmission of a break signal to the attached device through the lower level physical layer state machine. When the upper level application layer eventually closes the connection, the EnableSSP signal will be deasserted causing state 606 (e.g., receive frame state machine 502) to transition to a next state (e.g., idle state 500 of FIG. 5).

Those of ordinary skill in the art will recognize a variety of alternative state machine models and associated states and transitions to provide the receive portion of the simplified SSP link layer processing features and aspects hereof. Further, those skilled in the art will recognize that an overall reset condition applied to the SAS device may reset operation of the state machine 502 of FIGS. 5 and 6. For example, a higher level application layer state machine may de-assert the EnableSSP signal at any time causing a transition out of any current state back to the IDLE state (500 of FIG. 5). Such a ubiquitous transition is not shown in the state diagram of FIGS. 5 and 6 to simplify the diagrams however those skilled in the art will readily recognize adaptations to add such state transitions.

Further, those of ordinary skill in the art will recognize that ALIGN primitives are sent from time to time in accordance with the SAS standards. Such ALIGN primitives relate to synchronization and speed negotiation at the lower levels of control of a SAS communication link. As regards the state machine models of FIGS. 5 through 7, the current state is not changed while the link is engaged in such synchronization exchanges. Those of ordinary skill in the art will readily recognize ubiquitous transitions not shown in FIGS. 5 through 7 in each of the various states to remain in the current state while ALIGN primitives are being exchanged for link synchronization and speed negotiating.

FIG. 7 provides additional details of an exemplary implementation of the TX_Frame_SM 504 portion of link layer state machine 410 of FIG. 4 to transmit a single SSP frame from an attached SAS device. The higher level (application layer) state machine may establish the open connection to connect to the desired SAS device and then enable the SSP link layer state machine to transmit a supplied SSP frame. When enabled by the higher level application layer state machine (by assertion of EnableSSP and assertion of TxFrame as suggested above), TX_CB state 700 is entered. Upon entry to state 700, a CREDIT_BLOCKED primitive is sent to an attached device to indicate no additional buffer credits are forthcoming from this device. In addition, a Credit_Timer may be started to await receipt of an RRDY or CREDIT_BLOCKED primitive from the attached SAS device. State 700 then transition to TX_CWAIT state 704 to await either such a primitive reception or a timeout in that wait. State 704 loops as indicated by arrow 750 so long as no RRDY primitive or CREDIT_BLOCKED primitive is received and so long as there is not a timeout waiting for one of the two primitives to be received. Reception of an RRDY primitive from the attached device indicates buffer credit within the attached SAS device to receive at least one transmitted SSP frame. If a CREDIT_BLOCKED primitive is received (indicating no buffer credit is available) or a timeout is encountered waiting for one of the received primitives, state 704 transitions to TX_SEND_DONE state 706 as indicated by transition arrow 754. State 706 is discussed further herein below.

If an RRDY primitive is received indicating available buffer credit in the attached SAS device to receive an SSP frame, state 704 transitions to TX_SOF state 708. State 708 starts the frame transmission by directing the lower level physical layer state machine to send an SOF (start of frame) primitive to the attached device. State 708 also stops the Credit_Timer since the state machine is no longer waiting for available buffer credit in the attached device. On the next clock cycle (NextClock) state 708 transitions to TX_DATA state 710 as indicated by transition arrow 756. State 710 commences transmission of the frame data by so directing the lower level physical layer state machine. State 710 loops as indicated by arrow 758 awaiting a signal from the upper level state machine that it is time to send a CRC associated with the transmitted frame data (SendCRC asserted active high). Upon sensing SendCRC asserted active high, state 710 transitions to TX_CRC state 712 to cause sending of the CRC associated with the transmitted frame (as indicated by transition arrow 760). State 712 directs the lower level state machine to transmit the CRC information associated with the transmitted frame data and transitions to TX_EOF state 714 to direct transmission of the EOF primitive indicating the end of a frame transmission. Also, state 714 starts and ACK/NAK timer to await reception of an ACK or NAK acknowledgement of the transmitted frame from the attached SAS device. State 714 then transitions to TX_ACK_WAIT state 716 to await reception of an ACK or a NAK primitive or a timeout in waiting for such a received primitive. State 716 loops until such a primitive is received or until a timeout in the wait. When an ACK or NAK is received or the timeout is encountered, state 716 transitions to state 706 to complete the frame transmission.

State 706 handles completion of the frame transmission based on any of a number of completion status and reasons. All possibly active timers are stopped (Credit_Timer and ACK/NAK_Timer) and an appropriate DONE primitive is sent to the attached SAS device. Further a Done_Timer is started to await receipt of a DONE primitive from the attached device in response to a DONE primitive sent thereto from this link layer state machine. If the transmit completion is a transition from state 704 as above and thus due to no available buffer credit (CBRcvd) or a timeout waiting for buffer credit (CreditTimeout), a DONE primitive with a CreditTimeout parameter is sent to the attached SAS device. If the transmit is completed by a transition from state 716 due to an ACK/NAKTimeout, a DONE primitive is sent with an ACK/NAK-Timeout parameter. If the completion is due to reception of an ACK or NAK primitive from the attached SAS device, a DONE primitive with a Normal completion parameter is sent to the attached SAS device.

If a DONE primitive is received from the attached device the higher level application layer is directed to close the open connection. If a DoneTimeout is encountered waiting for the DONE primitive from the attached device, the higher level application layer state machine is directed to send a break signal to the attached device. Eventually, the higher level application layer state machine will close or reset the open connection and disable the link layer state machine by de-asserting the EnableSSP signal forcing the TX_Frame_SM 504 state machine to return to the IDLE state 500 of FIG. 5.

Those of ordinary skill in the art will recognize a variety of alternative state machine models and associated states and transitions to provide the transmit frame portion of the simplified SSP link layer processing features and aspects hereof as exemplified in FIG. 7. Further, those skilled in the art will recognize that a reset condition may reset operation of the state machine 504 of FIGS. 5 and 7. For example, a higher level application layer state machine may de-assert the EnableSSP signal at any time causing a transition out of any current state back to the IDLE state (500 of FIG. 5). Such a ubiquitous transition is not shown in the state diagram of FIGS. 5 and 7 to simplify the diagrams however those skilled in the art will readily recognize adaptations to add such state transitions.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A Serial Attached SCSI ("SAS") device comprising:
    a Serial SCSI Protocol ("SSP") management element for performing management functions with other SAS SCSI devices coupled to the SAS device; and
    a simplified SSP link layer circuit coupled to the management element to manage SSP link layer exchanges in conjunction with the management element,
    wherein the simplified SSP link layer circuit is configured to exchange only a single frame during an open connection by the simplified SSP link layer with a second SAS device,
    wherein the simplified SSP link layer circuit is further configured to preclude reception of more than one data frame in said open connection and to preclude transmission of more than one data frame in said open connection,
    wherein the simplified SSP link layer is devoid of logic to process one or more of interlocked SAS frames, multiple buffer credits of the SAS protocol, and full-duplex SAS protocol exchanges.

2. The SAS device of claim 1 wherein the link layer circuit further comprises:
    an SSP link layer state machine circuit for controlling SSP link layer exchanges in accordance with a state machine model such that only a single frame is exchanged during said open connection to the second SAS device.

3. The SAS device of claim 2 further comprising:
    an SSP application layer circuit coupled to the SSP link layer state machine circuit,
    wherein the SSP application layer circuit is configured to open a connection to the second SAS device,
    wherein the SSP application layer circuit is further configured to enable operation of the SSP link layer state machine in response to opening the connection, and
    wherein the SSP link layer state machine circuit is operable in an IDLE state when not enabled by the SSP application layer circuit.

4. The SAS device of claim 3
    wherein the SSP application layer is further configured to close the connection following exchange of a single frame with the second SAS device,
    wherein the SSP application layer is further configured to disable operation of the SSP link layer state machine circuit in response to closing the connection, and
    wherein the SSP link layer state machine circuit continues operation in the IDLE state in response to being disabled by the SSP application layer circuit.

5. The SAS device of claim 1
    wherein the SSP link layer state machine circuit is configured to assure exchange of only a single frame during an open connection by controllably sending RRDY and CREDIT_BLOCKED primitives to a second SAS device.

6. The SAS device of claim 5
    wherein the SSP link layer state machine circuit is configured to send a single RRDY primitive followed by a CREDIT_BLOCKED primitive to the second device to allow reception of a single frame from the second device when the open connection is intended to receive a single frame, and
    wherein the SSP link layer state machine circuit is configured to send a CREDIT_BLOCKED primitive and no RRDY primitive to the second device to permit transmission of a single frame to the second device when the open connection is intended to transmit a single frame.

7. A method operable in a first Serial Attached SCSI ("SAS") device to exchange a Serial SCSI Protocol ("SSP") frame with a second SAS device to manage aspects of the second SAS device, the method comprising:
    opening a connection to the second SAS device;
    enabling operation of a simplified SSP link layer state machine circuit within the first SAS device to controllably transmit or receive only a single SSP frame with the second SAS device, wherein the simplified SSP link layer state machine precludes transmission or reception of any more than one frame when enabled;
    closing the open connection; and
    disabling continuing operation of the simplified SSP link layer state machine circuit in response to closing the open connection,
    wherein the method is devoid of steps to process one or more of: interlocked SAS frames, multiple buffer credits of the SAS protocol, and full-duplex SAS protocol exchanges, during the open connection with the second SAS device, and
    wherein the simplified SSP link layer is devoid of logic to process one or more of: interlocked SAS frames, multiple buffer credits of the SAS protocol, and full-duplex SAS protocol exchanges, during the open connection with the second SAS device.

8. The method of claim 7
    wherein the step of enabling further comprises enabling the link layer state machine to transmit only a single SSP frame from the first SAS device to the second SAS device.

9. The method of claim 8
    wherein the step of enabling the link layer state machine circuit to transmit further comprises:
    sending a CREDIT_BLOCKED primitive from the first SAS device to the second SAS device without sending any RRDY primitives to indicate that the first SAS device cannot receive any SSP frame; and
    transmitting a supplied SSP frame from the first SAS device to the second SAS device.

10. The method of claim 7
wherein the step of enabling further comprises enabling the link layer state machine to receive only a single SSP frame within the first SAS device from the second SAS device.

11. The method of claim 10
wherein the step of enabling the link layer state machine circuit to receive further comprises:
sending a single RRDY primitive from the first SAS device to the second SAS device to indicate a buffer credit to receive a single SSP frame;
sending a CREDIT_BLOCKED primitive from the first SAS device to the second SAS device to indicate that no additional buffer credit is available in the first SAS device; and
receiving an SSP frame within the first SAS device from the second SAS device.

12. A method operable in a first serial attached SCSI ("SAS") device to exchange a Serial SCSI Protocol ("SSP") frame with a second SAS device to manage aspects of the second SAS device, the method consisting:
opening a connection to the second SAS device;
exchanging no more than a single SSP frame with the second SAS device wherein the step of exchanging precludes reception or transmission of more than a single SSP frame while the connection is open; and
closing the open connection,
wherein the method is devoid of steps to process one or more of: interlocked SAS frame, multiple buffer credits of the SAS protocol, and full-duplex SAS protocol exchanges, during the open connection with the second SAS device.

13. The method of claim 12
wherein the step of exchanging further comprises enabling a simplified SSP link layer state machine to transmit only a single SSP frame from the first SAS device to the second SAS device.

14. The method of claim 13
wherein the step of enabling the simplified SSP link layer state machine circuit to transmit further comprises:
sending a CREDIT_BLOCKED primitive from the first SAS device to the second SAS device without sending any RRDY primitives to indicate that the first SAS device cannot receive any SSP frame; and
transmitting a supplied SSP frame from the first SAS device to the second SAS device.

15. The method of claim 12
wherein the step of exchanging further comprises enabling a simplified SSP link layer state machine to receive only a single SSP frame within the first SAS device from the second SAS device.

16. The method of claim 15
wherein the step of enabling the simplified SSP link layer state machine circuit to receive further comprises:
sending a single RRDY primitive from the first SAS device to the second SAS device to indicate a buffer credit to receive a single SSP frame;
sending a CREDIT_BLOCKED primitive from the first SAS device to the second SAS device to indicate that no additional buffer credit is available in the first SAS device; and
receiving an SSP frame within the first SAS device from the second SAS device.

* * * * *